(12) United States Patent
Kamura

(10) Patent No.: US 10,112,627 B2
(45) Date of Patent: Oct. 30, 2018

(54) AIR SPRING AND RAILCAR

(71) Applicant: KAWASAKI JUKOGYO KABUSHIKI KAISHA, Hyogo (JP)

(72) Inventor: Keiichiro Kamura, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 221 days.

(21) Appl. No.: 15/030,112

(22) PCT Filed: Sep. 24, 2014

(86) PCT No.: PCT/JP2014/004884
§ 371 (c)(1),
(2) Date: Apr. 18, 2016

(87) PCT Pub. No.: WO2015/056408
PCT Pub. Date: Apr. 23, 2015

(65) Prior Publication Data
US 2016/0264155 A1    Sep. 15, 2016

(30) Foreign Application Priority Data

Oct. 16, 2013 (JP) .................................. 2013-215742

(51) Int. Cl.
*B61F 5/10* (2006.01)
*B61F 5/22* (2006.01)
(Continued)

(52) U.S. Cl.
CPC .................. *B61F 5/10* (2013.01); *B61F 1/14* (2013.01); *B61F 5/22* (2013.01); *F16F 9/05* (2013.01); *F16F 9/437* (2013.01)

(58) Field of Classification Search
CPC ...... B61F 5/00; B61F 5/02; B61F 5/04; B61F 5/10; B61F 5/38; B61F 5/386
See application file for complete search history.

(56) References Cited

U.S. PATENT DOCUMENTS 5,572,933 A * 11/1996 Thompson ............. A61G 7/005
108/7
5,749,566 A * 5/1998 Vitale ...................... F16F 9/04
267/64.23
(Continued)

FOREIGN PATENT DOCUMENTS

JP        07-267084 A    10/1995
JP        11-078877 A    3/1999

OTHER PUBLICATIONS

International Search Report; PCT/JP2014/004884 dated Nov. 11, 2014.
(Continued)

*Primary Examiner* — Robert J McCarry, Jr.
(74) *Attorney, Agent, or Firm* — Studebaker & Brackett PC

(57) ABSTRACT

An air spring includes: an upper surface plate; a lower surface plate opposing the upper surface plate; an elastic film airtightly coupling a peripheral portion of the upper surface plate and a peripheral portion of the lower surface plate to each other to form an air chamber inside the air spring; the air chamber connected to the lower surface plate; and an exhaust passage forming body at which an exhaust passage is formed. The exhaust passage includes an exhaust passage inlet and an exhaust passage outlet. The exhaust passage inlet is open to an outside of the air chamber when a clearance between the upper surface plate and the lower surface plate in an upward/downward direction falls within a predetermined allowable range and is open to an inside of the air chamber when the clearance exceeds an upper limit of the predetermined allowable range.

11 Claims, 5 Drawing Sheets

(51) Int. Cl.
*F16F 9/05* (2006.01)
*B61F 1/14* (2006.01)
*F16F 9/43* (2006.01)

(56) References Cited

U.S. PATENT DOCUMENTS

| | | | | |
|---|---|---|---|---|
| 5,947,031 A * | 9/1999 | Polley | ............... | B60G 17/0523 |
| | | | | 105/199.1 |
| 2004/0201195 A1* | 10/2004 | Plath | ................. | B60G 17/0525 |
| | | | | 280/124.16 |
| 2011/0093239 A1* | 4/2011 | Holbrook | ............... | G01G 19/10 |
| | | | | 702/174 |

OTHER PUBLICATIONS

Written Opinion; PCT/JP2014/004884 dated Nov. 11, 2014.
International Preliminary Report on Patentability of the International Searching Authority; PCT/JP2014/004884 dated Apr. 19, 2016.

* cited by examiner

AIR SPRING AND RAILCAR

TECHNICAL FIELD

The present invention relates to an air spring and a railcar including the air spring. More specifically, the present invention relates to a technology of preventing a spring height of an air spring from abnormally increasing by excessive air supply to the air spring.

BACKGROUND ART

A carbody of a railcar is supported by a bogie through a carbody suspension including a bolster spring. The bolster spring is a spring provided between a bogie frame of the bogie and the carbody. The bolster spring eases impacts applied from the bogie to the carbody to improve a ride quality of the railcar. As the bolster spring, an air spring is typically used. The air spring can expand and contract in an upward/downward direction by the supply or discharge of compressed air to or from an air chamber formed inside the air spring. By utilizing the expansion and contraction of the air spring, an automatic level controlling operation, a carbody inclination controlling operation, and the like are performed in the railcar. The automatic level controlling operation is an operation of maintaining the height of the railcar within a certain range. The carbody inclination controlling operation is an operation of inclining the carbody such that excessive centrifugal force acting on passengers when the railcar travels through a curved line is reduced.

The air spring includes a height stopper for the purpose of preventing the spring height of the air spring from becoming too high beyond a predetermined allowable range. Known as the height stopper of the air spring is a so-called mechanical stopper configured to mechanically restrict upward displacement of the carbody relative to the bogie by contact between a first restricting member provided at the bogie and a second restricting member provided at the carbody. In addition to the mechanical stopper, the following height stoppers of the air spring have been proposed.

For example, in the railcar described in PTL 1, the air spring is provided with an emergency exhaust valve configured to open when the spring height of the air spring exceeds the allowable range. When the spring height of the air spring falls within the allowable range, an open/close portion of the emergency exhaust valve is coupled to the carbody by a stretchable link. When the spring height exceeds an allowable upper limit, an upward movement of the carbody is transmitted to the open/close portion of the emergency exhaust valve through the link. Thus, the emergency exhaust valve opens.

Further, for example, in the railcar described in PTL 2, the air spring is provided with an exhaust bypass, and the exhaust bypass is provided with a mechanical valve configured to open when the spring height of the air spring exceeds the allowable range. The air spring includes an operation arm of the mechanical valve in the air chamber. The operation arm is operated by a diaphragm when the air spring becomes an excessive air supply state. Thus, the mechanical valve opens.

CITATION LIST

Patent Literature

PTL 1: Japanese Laid-Open Patent Application Publication No. 7-267084

PTL 2: Japanese Laid-Open Patent Application Publication No. 11-78877

SUMMARY OF INVENTION

Technical Problem

When the height stopper of the air spring is the mechanical stopper, the restricting members provided at the bogie and the carbody are made of steel so as to have rigidity for bearing force applied from the air spring, and each of the restricting members has a large size surrounding a periphery of the air spring (for example, one side of the restricting member is not less than 100 mm). The weight reduction of the railcar has been desired, and the reduction in the weight of the height stopper can contribute to the weight reduction of the railcar. Further, a space around the air spring is utilized by pipes and wires extending between the bogie and the carbody. However, if the mechanical stopper is provided around the air spring, the pipes and wires has to be provided so as to avoid the mechanical stopper. Thus, the degree of freedom of the layout of the pipes and wires is impaired.

When the height stopper of the air spring is the emergency exhaust valve described in PTL 1, the open/close portion of the emergency exhaust valve of the air spring and the carbody are coupled to each other by the link. Therefore, work of attaching and detaching the link to or from the carbody or the open/close portion and adjusting those components is required at the time of maintenance of the railcar.

When the height stopper of the air spring is the mechanical valve described in PTL 2, a contact state between the diaphragm and the operation arm changes by twisting of the diaphragm, the twisting being caused by rolling or left/right swinging of the carbody. Therefore, the spring height of the air spring when the mechanical valve opens varies.

The present invention was made under the above circumstances, and an object of the present invention is to realize easy maintenance and weight reduction regarding the air spring including the height stopper and the railcar including the air spring.

Solution to Problem

An air spring according to the present invention includes: an upper surface plate; a lower surface plate opposing the upper surface plate; an elastic film airtightly coupling a peripheral portion of the upper surface plate and a peripheral portion of the lower surface plate to each other to form an air chamber inside the air spring; an elastic supporting member connected to the lower surface plate; and an exhaust passage forming member, an exhaust passage being formed at the exhaust passage forming member. The exhaust passage includes an exhaust passage inlet and an exhaust passage outlet, the exhaust passage inlet being open to an outside of the air chamber when a clearance between the upper surface plate and the lower surface plate in an upward/downward direction falls within a predetermined allowable range and being open to an inside of the air chamber when the clearance exceeds an upper limit of the predetermined allowable range, the exhaust passage outlet being open to an atmosphere.

A railcar according to the present invention includes: a carbody including an underframe; a bogie including a bogie frame; and the air spring provided between the bogie frame and the underframe.

In the air spring configured as above, the clearance between the upper surface plate and the lower surface plate in the upward/downward direction is a variable element of the height of the air spring. Therefore, the height of the air spring is adjusted based on the clearance between the upper surface plate and the lower surface plate in the upward/downward direction. In the air spring according to the present invention, when the clearance between the upper surface plate and the lower surface plate in the upward/downward direction exceeds the upper limit of the predetermined allowable range (i.e., when the height of the air spring exceeds an upper limit of a spring height allowable range), the exhaust passage inlet is open to the inside of the air chamber, so that the exhaust passage is connected to the air chamber. When the exhaust passage and the air chamber are connected to each other, the air in the air chamber is discharged to the outside through the exhaust passage. When the clearance between the upper surface plate and the lower surface plate in the upward/downward direction falls within the predetermined allowable range (i.e., when the height of the air spring falls within the predetermined spring height allowable range) by forcibly discharging the air from the air chamber as above, the exhaust passage inlet is open to the outside of the air chamber, so that the connection between the exhaust passage and the air chamber is canceled, and the discharge of the air from the air chamber is terminated. Thus, the height of the air spring can be prevented from abnormally increasing beyond the spring height allowable range.

Unlike the conventional mechanical stopper, the force of the air spring according to the present invention does not act on the exhaust passage forming member serving as the height stopper of the air spring. Therefore, the exhaust passage forming member can be made lighter in weight and smaller in size than the conventional mechanical stopper. On this account, the railcar according to the present invention including the air spring can be made lighter in weight than the railcar including the conventional mechanical stopper and the conventional air spring.

Further, the height of the air spring according to the present invention is adjusted based on the clearance between the upper surface plate and the lower surface plate in the upward/downward direction. Therefore, the exhaust passage forming member serving as the height stopper of the air spring is not coupled to the carbody by a link or the like. On this account, the air spring according to the present invention can be made simpler in assembly to the railcar, maintenance, and the like than the conventional air spring including the height stopper coupled to the carbody by the link. Further, since the air spring according to the present invention does not include an exhaust valve, an opening/closing actuator for the exhaust valve, a sensor, or the like, the air spring according to the present invention is simpler in configuration, lighter in weight, and smaller in size than the air spring including the height stopper having the exhaust valve.

Advantageous Effects of Invention

According to the present invention, when the clearance between the upper surface plate and lower surface plate of the air spring in the upward/downward direction exceeds the allowable range, the exhaust passage and the air chamber are connected to each other, so that the air is discharged from the air chamber through the exhaust passage. With this, the spring height of the air spring can be prevented from abnormally increasing. The maintenance of the air spring can be made easier than the maintenance of the conventional air spring including the height stopper coupled to the carbody by the link. Further, the railcar including the air spring according to the present invention can be made lighter in weight than the railcar including the conventional mechanical stopper and the conventional air spring.

DESCRIPTION OF EMBODIMENTS

First Embodiment

Figure 1:
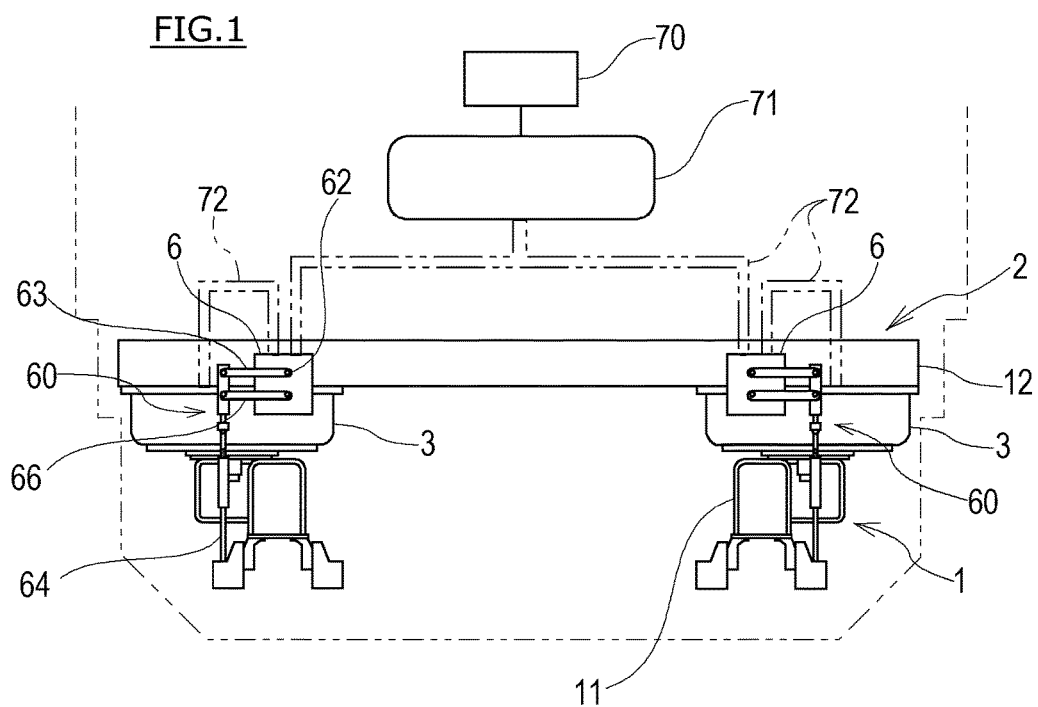
FIG. 1 is a front view showing an air spring according to a first embodiment of the present invention, the air spring being provided between a bogie and a carbody.
Figure 2:
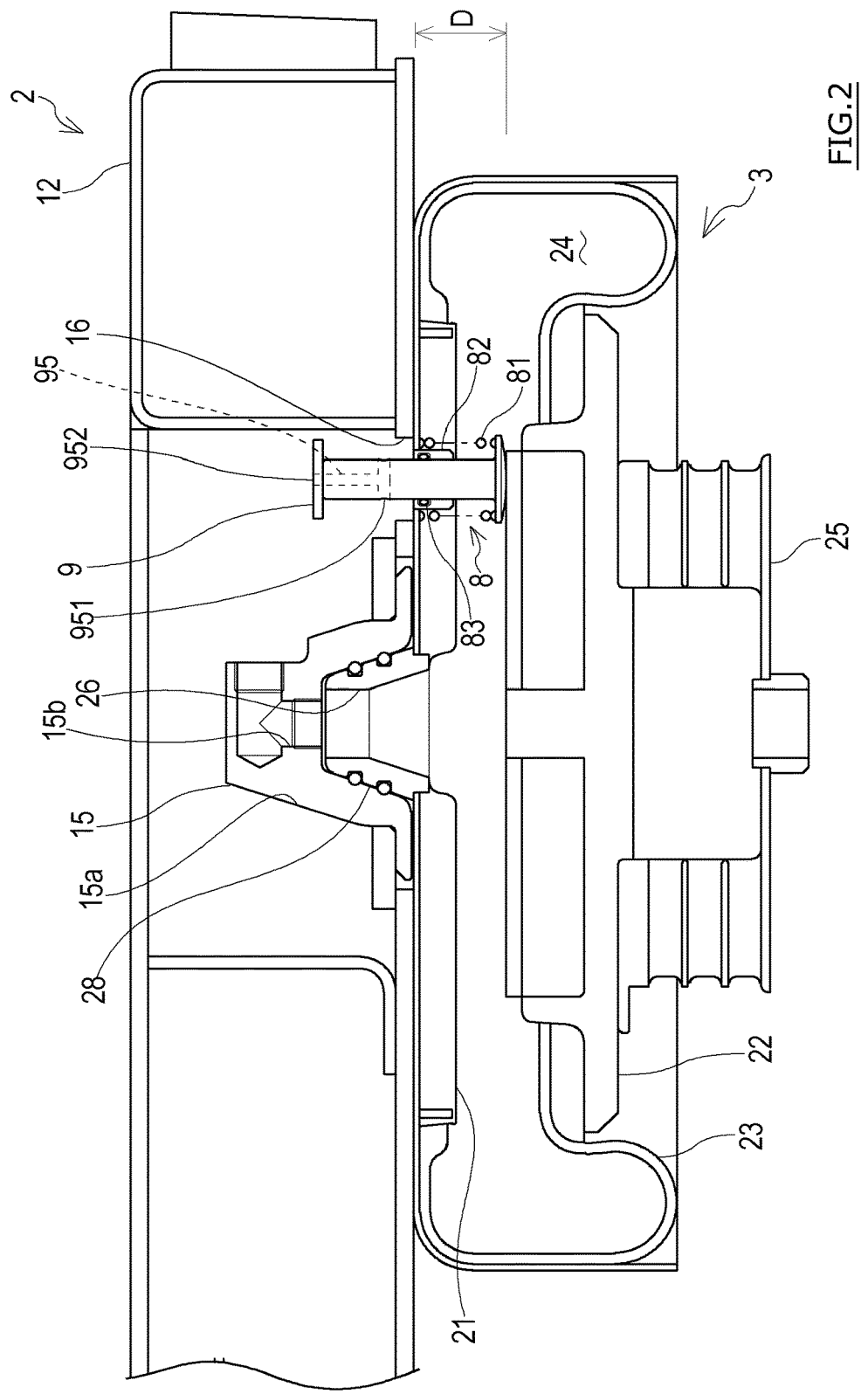
FIG. 2 is a cross-sectional view showing the air spring according to the first embodiment when a height of the air spring falls within a spring height allowable range.
Figure 3:
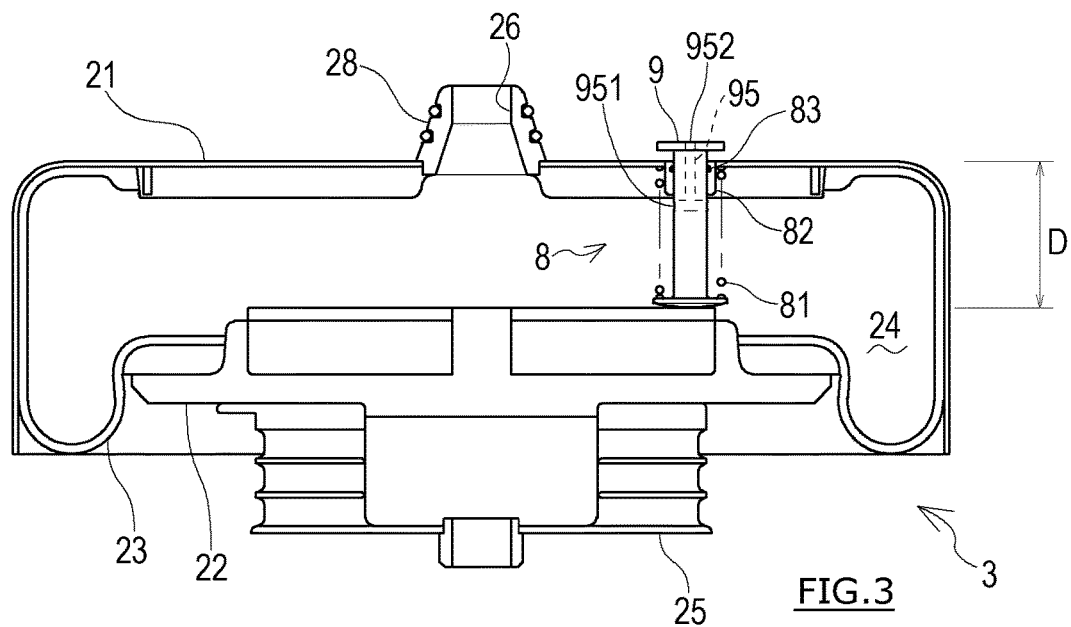
FIG. 3 is a cross-sectional view showing the air spring according to the first embodiment when the height of the air spring exceeds an upper limit of the spring height allowable range.
Figure 4:
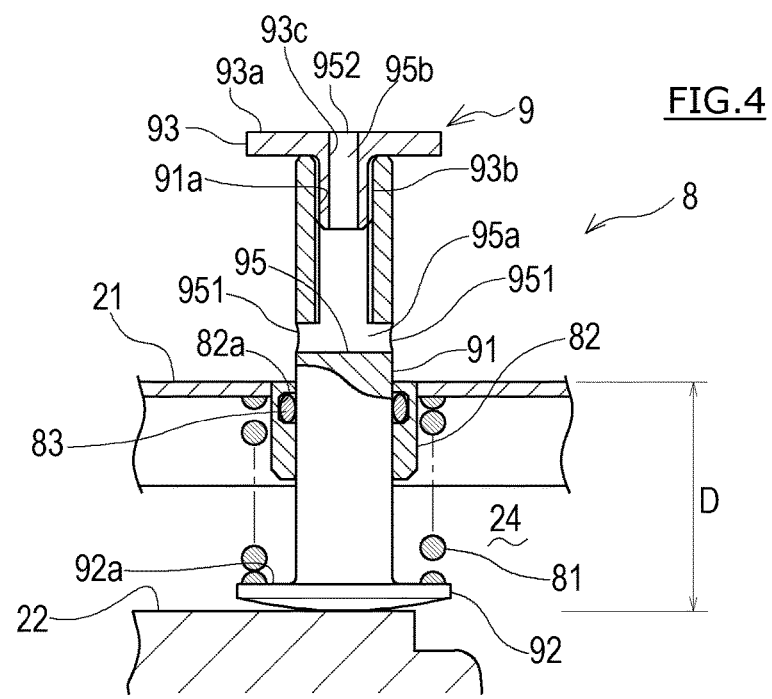
FIG. 4 is an enlarged view showing a height stopper mechanism according to the first embodiment.

Hereinafter, the first embodiment of the present invention will be explained in reference to the drawings. FIG. 1 is a front view showing an air spring according to the first embodiment of the present invention, the air spring being provided between a bogie and a carbody. FIG. 2 is a cross-sectional view showing the air spring according to the first embodiment when a height of the air spring falls within a spring height allowable range. FIG. 3 is a cross-sectional view showing the air spring according to the first embodiment when the height of the air spring exceeds an upper limit of the spring height allowable range. FIG. 4 is an enlarged view showing a height stopper mechanism according to the first embodiment.

As shown in FIG. 1, a railcar according to the first embodiment of the present invention includes: a bogie 1; a carbody suspension structure including air springs 3; and a carbody 2 supported by the bogie 1 through the carbody suspension structure. The bogie 1 includes a bogie frame 11 as a base of the bogie 1. The carbody 2 includes an underframe 12 as a base of a car bodyshell. The air springs 3 are provided between the bogie frame 11 and the underframe 12 so as to be distributed in left, right, front, and rear directions of the railcar in a balanced manner. The carbody 2 is supported by the air springs 3 so as to be tiltable relative to the bogie 1 in a car width direction.

Compressed air is supplied to each of the air springs 3 through an air supply pipe 72 from a reservoir 71 provided at the carbody 2. The reservoir 71 stores the compressed air generated by an air compressor 70. Automatic level controlling valves 6 are provided for the respective air springs 3 so as to be disposed on the air supply pipe 72. The automatic level controlling valve 6 is provided with a supply valve and a discharge valve (both not shown). When the supply valve opens, the compressed air is supplied to the air spring 3, and therefore, the height of the air spring 3 increases. When the discharge valve opens, the air is discharged from the air spring 3 to the atmosphere, and therefore, the height of the air spring 3 decreases.

A casing of the automatic level controlling valve 6 is attached to the underframe 12. A valve operation mechanism 60 of the automatic level controlling valve 6 is constituted by: an operating shaft 62 projecting from the automatic level controlling valve 6; an operation link 63; a coupling link 64; a horizontal link 66; and the like. A base end of the operation link 63 is coupled to the operating shaft 62, and a tip end of the operation link 63 is coupled to an upper end of the coupling link 64. A lower end of the coupling link 64 is coupled to the bogie frame 11 so as to be swingable. The casing of the automatic level controlling valve 6 and the coupling link 64 are coupled to each other by the horizontal link 66.

In the automatic level controlling valve 6 and the valve operation mechanism 60, when the operation link 63 is located at a horizontal position, air is not supplied to or discharged from the air spring 3. When the height of the underframe 12 changes, and the tip end of the operation link 63 rotates downward from the horizontal position, the automatic level controlling valve 6 is switched to a state of supplying the compressed air to the air spring 3. Further, when the height of the underframe 12 changes, and the tip end of the operation link 63 rotates upward from the horizontal position, the automatic level controlling valve 6 is switched to a state of discharging the air from the air spring 3. Thus, the automatic level controlling valve 6 adjusts the supply and discharge of the air to and from the air spring 3 so as to maintain the height of the carbody 2 constant.

Next, the structure of the air spring 3 will be explained in detail. As shown in FIG. 2, the air spring 3 is constituted by: an upper surface plate 21; a lower surface plate 22 opposing the upper surface plate 21; an elastic film 23 airtightly coupling a peripheral end portion of the upper surface plate 21 and a peripheral end portion of the lower surface plate 22 to each other to form an air chamber 24 inside the air spring 3; an elastic supporting body 25 (elastic supporting member) connected to the lower surface plate 22; and the like. The elastic supporting body 25 is constituted by circular or annular rubber members and metal plates alternately stacked on one another.

A boss 28 having a conical shape is formed at a middle portion of the upper surface plate 21 of the air spring 3 so as to project upward. An air supply/exhaust port 26 is provided at the middle portion of the boss 28 and penetrates the boss 28 in an upward/downward direction. An air spring receiver 15 is provided at a position of the underframe 12, the position opposing the air spring 3 in the upward/downward direction. The air spring receiver 15 includes a fitted portion 15a having a conical shape complementarily corresponding to the shape of the boss 28 of the air spring 3. An air supply port 15b connected to the air supply pipe 72 is open on the fitted portion 15a.

When coupling the bogie frame 11 and the underframe 12 to each other, the air spring 3 is first placed on the bogie frame 11, and the underframe 12 is then placed on the air spring 3. When placing the underframe 12 on the air spring 3, the boss 28 of the air spring 3 is fitted into the fitted portion 15a of the underframe 12 while being guided by the fitted portion 15a. When the boss 28 and the fitted portion 15a are fitted to each other, the air supply/exhaust port 26 of the air spring 3 and the air supply port 15b of the air spring receiver 15 are connected to each other. With this, the air chamber 24 of the air spring 3 and the air supply pipe 72 are connected to each other, so that the compressed air can be supplied from the reservoir 71 to the air chamber 24.

If a malfunction of the air compressor 70, rolling of the carbody 2, a malfunction of the automatic level controlling valve 6 or the valve operation mechanism 60, or the like occurs, the air spring 3 configured as above may become an excessive air supply state, and therefore, the height of the air spring 3 may abnormally increase. To maintain the height of the air spring 3 within a predetermined allowable range (hereinafter referred to as a "spring height allowable range"), the air spring 3 includes a height stopper mechanism 8. The spring height allowable range is predetermined for each of the air springs 3 or the railcars.

The height stopper mechanism 8 will be explained in detail. As shown in FIG. 4, the height stopper mechanism 8 is constituted by: an exhaust passage forming body 9 (exhaust passage forming member) at which an exhaust passage 95 is formed; a tubular body 82 (tubular member) supporting the exhaust passage forming body 9; and a spring 81 (biasing member) configured to bias the exhaust passage forming body 9.

The tubular body 82 is provided at the upper surface plate 21 of the air spring 3 and penetrates the upper surface plate 21 in the upward/downward direction. The tubular body 82 moves together with the upper surface plate 21 in the upward/downward direction relative to the lower surface plate 22. An upper end of the tubular body 82 is open to an outside of the air chamber 24 (i.e., to the atmosphere). A lower end of the tubular body 82 is open to an inside of the air chamber 24. A sealing member holding portion 82a that is an annular groove is formed on an inner peripheral surface of the tubular body 82.

The exhaust passage forming body 9 is provided at the upper surface plate 21 and penetrates the upper surface plate 21 in the upward/downward direction. The exhaust passage forming body 9 has a columnar shape as a whole. An exhaust passage inlet 951 is open on a peripheral surface of the exhaust passage forming body 9, and an exhaust passage outlet 952 is open on one end surface of the exhaust passage forming body 9. The exhaust passage forming body 9 is constituted by: a columnar main member 91 extending in the upward/downward direction; a base end member 92 provided at a lower end of the main member 91; and a tip end member 93 provided at an upper end of the main member 91. The tubular body 82 is externally fitted to the main member 91 of the exhaust passage forming body 9. The tubular body 82 slides on the peripheral surface of the exhaust passage forming body 9 in the upward/downward direction in accordance with the movement of the upper surface plate 21. A gap between the inner peripheral surface of the tubular body 82 and an outer peripheral surface of the exhaust passage forming body 9 is sealed by a sealing member 83 such as an O-ring provided at the sealing member holding portion 82a of the tubular body 82. The inside of the air chamber 24 and the outside of the air chamber 24 (i.e., the atmosphere) are isolated from each other by the sealing member 83.

The base end member 92 has a disc shape larger in diameter than the main member 91. An upper surface of the base end member 92 is joined to a lower surface of the main member 91. A lower surface of the base end member 92 is formed in a smooth spherical shape and contacts the lower surface plate 22 of the air spring 3. The lower surface of the base end member 92 may be subjected to a surface treatment such that friction between the lower surface of the base end member 92 and the lower surface plate 22 is reduced.

If twisting or lateral displacement of the air spring 3 occurs, the upper surface plate 21 rotates relative to the lower surface plate 22 or moves in a lateral direction relative to the lower surface plate 22 to be displaced in a horizontal direction. When the upper surface plate 21 and the lower surface plate 22 are relatively displaced in the horizontal direction as above, the spherical lower surface of the base end member 92 slides or rolls on an upper surface of the lower surface plate 22. With this, an axial direction of the tubular body 82 and an axial direction of the exhaust passage forming body 9 are kept parallel to each other. A load does not act on the exhaust passage forming body 9 from a direction other than the axial direction. Therefore, when the tubular body 82 slides on the peripheral surface of the exhaust passage forming body 9, galling does not occur, and operations of the height stopper mechanism 8 stabilize. Further, the exhaust passage forming body 9 is prevented from being damaged.

A portion of the upper surface of the base end member 92 serves as a spring seat 92a, the portion being located at an outer periphery side of the main member 91. The spring 81 is provided between the spring seat 92a and the upper surface plate 21. The spring 81 is in a compressed state when the height of the air spring 3 falls within the spring height allowable range. The spring 81 has a free length when the height of the air spring 3 is equal to or more than the upper limit of the spring height allowable range. The exhaust passage forming body 9 is biased by the spring 81 toward the lower surface plate 22 such that the lower surface of the base end member 92 contacts the lower surface plate 22.

The tip end member 93 integrally includes a head portion 93a and a screw portion 93b. The head portion 93a is formed in a disc shape having a diameter larger than an outer diameter of the main member 91 and an inner diameter of the tubular body 82. The screw portion 93b is formed so as to project from a lower surface of the head portion 93a. An external screw is cut on an outer periphery of the screw portion 93b. A screw hole 91a having a diameter corresponding to a diameter of the screw portion 93b of the tip end member 93 is formed on an upper end surface of the main member 91. The tip end member 93 and the main member 91 are coupled to each other in such a manner that the screw portion 93b of the tip end member 93 is screwed into the screw hole 91a of the columnar member.

The head portion 93a of the tip end member 93 forms a tip end of the exhaust passage forming body 9 projecting upward from the upper surface plate 21 of the air spring 3. As above, to prevent interference with the exhaust passage forming body 9 projecting upward from the air spring 3, an opening portion 16 is formed at a position of the underframe 12, the position corresponding to the exhaust passage forming body 9. The head portion 93a of the tip end member 93 can contact the upper surface of the upper surface plate 21 and serves as a stopper for preventing the exhaust passage forming body 9 from falling off from the tubular body 82.

The exhaust passage 95 formed at the exhaust passage forming body 9 is formed in a T shape by a first passage 95a and a second passage 95b. The first passage 95a is located at an upper portion of the exhaust passage forming body 9 and penetrates the exhaust passage forming body 9 in a radial direction of the exhaust passage forming body 9. The second passage 95b extends in the axial direction of the exhaust passage forming body 9.

One end of the first passage 95a is open on a peripheral surface of the main member 91 of the exhaust passage forming body 9 to form the exhaust passage inlet 951. The other end of the first passage 95a is open at the screw hole 91a formed at the main member 91. The second passage 95b is formed by cooperation of the screw hole 91a formed at the main member 91 and a hole 93c penetrating the tip end member 93 in the upward/downward direction. An upper end of the second passage 95b is open on an upper surface of the tip end member 93, that is, an upper end surface of the exhaust passage forming body 9 to form the exhaust passage outlet 952.

A position of the exhaust passage inlet 951 in the exhaust passage forming body 9 is determined such that: when a clearance D between the upper surface plate 21 and the lower surface plate 22 in the upward/downward direction (hereinafter simply referred to as a "clearance D") falls within a predetermined allowable range, the exhaust passage inlet 951 is open to the outside of the air chamber 24 (i.e., to the atmosphere); and when the clearance D exceeds an upper limit of the predetermined allowable range, the exhaust passage inlet 951 is open to the inside of the air chamber 24. In the air spring 3, the clearance D is a variable element of the height of the air spring 3. The height stopper mechanism 8 according to the present embodiment adjusts the height of the air spring 3 based on the clearance D. The allowable range of the clearance D is determined based on the spring height allowable range of the air spring 3. Thus, the spring height allowable range and the allowable range of the clearance D correspond to each other. As shown in FIG. 2, in the present embodiment, a distance between the upper surface of the upper surface plate 21 and the upper surface of the lower surface plate 22 in the upward/downward direction is defined as the clearance D. However, the clearance D can be set suitably.

In the exhaust passage forming body 9 according to the present embodiment, the position of the exhaust passage inlet 951 is determined such that: when the clearance D falls within the allowable range, the exhaust passage inlet 951 is located higher than the sealing member holding portion 82a of the tubular body 82; and when the clearance D exceeds the upper limit of the allowable range, the exhaust passage inlet 951 is located lower than the sealing member holding portion 82a of the tubular body 82.

Operations of the height stopper mechanism 8 configured as above will be explained. The height of the air spring 3 changes based on a change in the load applied to the air spring 3 and the operations of maintaining the height of the carbody constant by the automatic level controlling valve 6. The base end member 92 of the exhaust passage forming body 9 is kept in contact with the lower surface plate 22 by biasing of the spring 81. Therefore, when the clearance D changes in accordance with the change in the height of the air spring 3, the tubular body 82 fixed to the upper surface plate 21 slides on the peripheral surface of the exhaust passage forming body 9 in the upward/downward direction.

As shown in FIG. 2, when the clearance D falls within the allowable range (i.e., when the height of the air spring 3 falls within the spring height allowable range), the exhaust passage inlet 951 of the exhaust passage forming body 9 is located outside the air chamber 24. In the present embodiment, the exhaust passage inlet 951 of the exhaust passage forming body 9 is located higher than the sealing member holding portion 82a of the tubular body 82. When the exhaust passage inlet 951 is located outside the air chamber 24, the exhaust passage 95 and the air chamber 24 are not connected to each other, so that the air in the air chamber 24 is not discharged through the exhaust passage 95.

As shown in FIG. 3, when the air spring 3 becomes the excessive air supply state, and the clearance D exceeds the upper limit of the allowable range (i.e., the height of the air spring 3 exceeds the upper limit of the spring height allowable range), the exhaust passage inlet 951 of the exhaust passage forming body 9 is located inside the air chamber 24. In the present embodiment, the exhaust passage inlet 951 of the exhaust passage forming body 9 is located lower than the sealing member holding portion 82a of the tubular body 82. When the exhaust passage inlet 951 is located inside the air chamber 24, the exhaust passage 95 and the air chamber 24 are in connection with each other, so that the air in the air chamber 24 is discharged to the outside through the exhaust passage 95. When the clearance D returns to the allowable range by the discharge of the excessive air from the air chamber 24 to the outside as above, the exhaust passage inlet 951 is again located outside the air chamber 24, so that the exhaust passage 95 and the air spring 3 are not in connection with each other.

According to the height stopper mechanism 8 explained above, when the clearance D exceeds the upper limit of the allowable range (i.e., when the height of the air spring 3 exceeds the upper limit of the spring height allowable range), the air is automatically discharged regardless of the presence/absence of the twisting or lateral displacement of the air spring 3. When the clearance D returns to the allowable range by the discharge of the excessive air from the air spring 3 (i.e., when the height of the air spring 3 falls within the spring height allowable range), the discharge of the air from the air spring 3 is automatically stopped. Thus, by the mechanical operations of the height stopper mechanism 8, the height of the air spring 3 can be prevented from abnormally increasing beyond the spring height allowable range.

Since the height stopper mechanism 8 according to the present embodiment operates mechanically, a sensor configured to detect the height of the air spring 3, a solenoid valve configured to open and close the connection between the air spring 3 and the atmosphere, an electric system configured to operate the solenoid valve, and the like are not required. As above, the height stopper mechanism 8 can be made simpler in structure, simpler in assembly work to the railcar, and lower in manufacturing cost than a conventional height stopper that operates electrically.

Unlike the conventional mechanical stopper, the force of the air spring 3 does not act on the exhaust passage forming body 9 of the height stopper mechanism 8 according to the present embodiment. Therefore, the exhaust passage forming body 9 can be made lighter in weight and smaller in size than the conventional mechanical stopper. On this account, the railcar including the air spring 3 according to the present embodiment can be made lighter in weight and lower in manufacturing cost than a railcar including the conventional mechanical stopper and the conventional air spring. Further, most of the height stopper mechanism 8 is located inside the air spring 3, so that the height stopper mechanism 8 does not interfere with a space around the air spring 3. Therefore, the space around the air spring 3 can be utilized as a space for wires and pipes. Therefore, the layout and laying work of the wires and pipes can be facilitated.

Further, in the height stopper mechanism 8 according to the present embodiment, whether the exhaust passage inlet 951 opens inside or outside the air chamber 24 is determined in accordance with the change in the clearance D. Therefore, the exhaust passage forming body 9 and the carbody 2 are not coupled to each other by a link or the like. On this account, the air spring 3 according to the present embodiment can be made simpler in assembly to the railcar, maintenance, and the like than the conventional air spring including the height stopper coupled to the carbody by the link. Further, since the air spring 3 according to the present embodiment does not include an exhaust valve, an opening/closing actuator for the exhaust valve, a sensor, or the like, the air spring 3 according to the present embodiment is simpler in configuration, lighter in weight, and smaller in size than the air spring including the height stopper having the exhaust valve.

Second Embodiment

Figure 5:
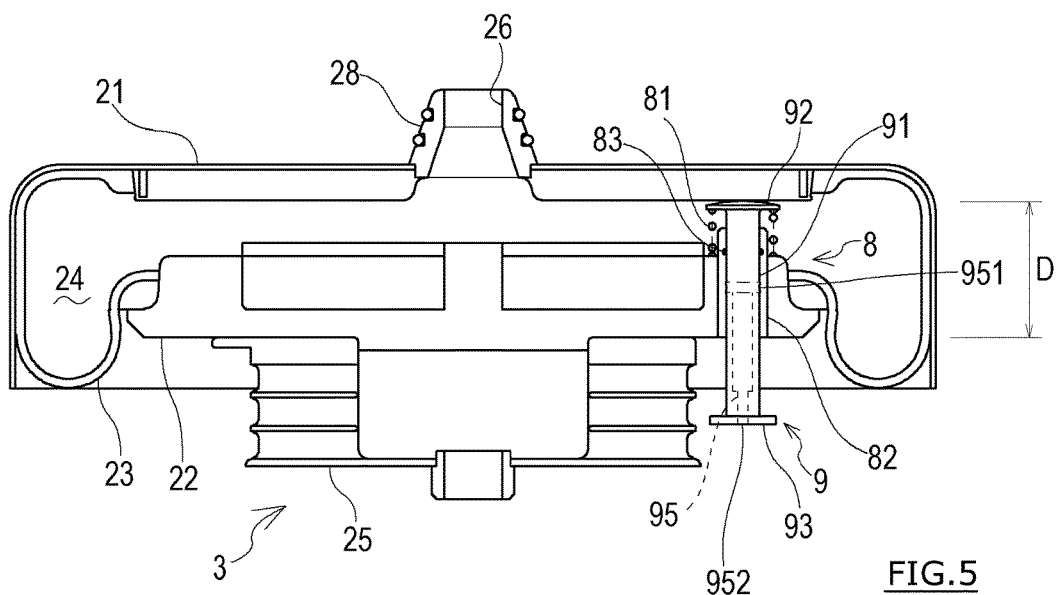
FIG. 5 is a cross-sectional view showing the air spring according to a second embodiment when the height of the air spring falls within the spring height allowable range.
Figure 6:
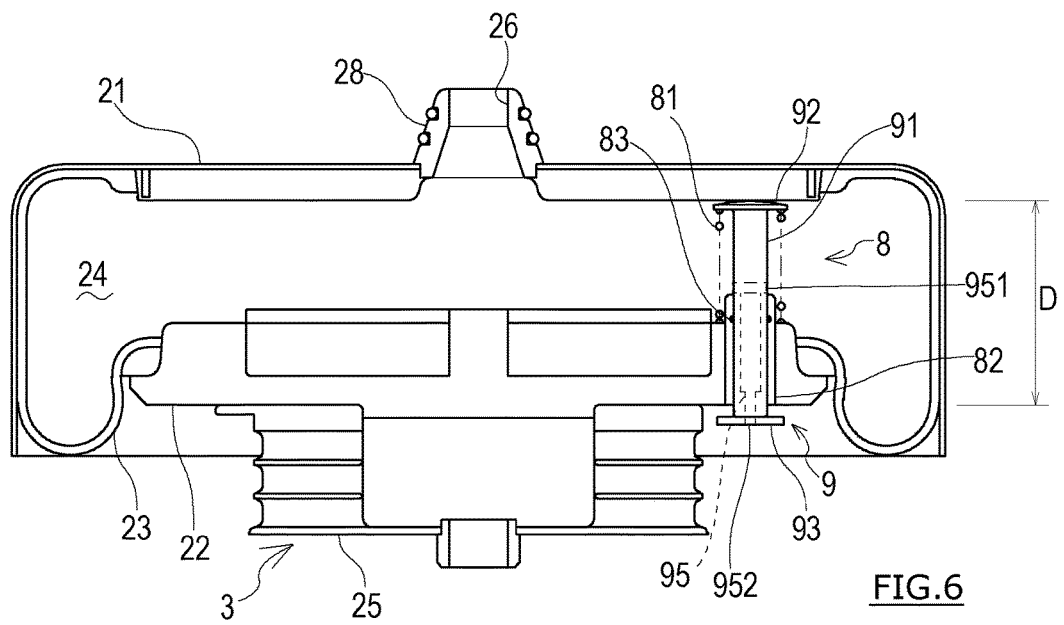
FIG. 6 is a cross-sectional view showing the air spring according to the second embodiment when the height of the air spring exceeds the upper limit of the spring height allowable range.
Figure 7:
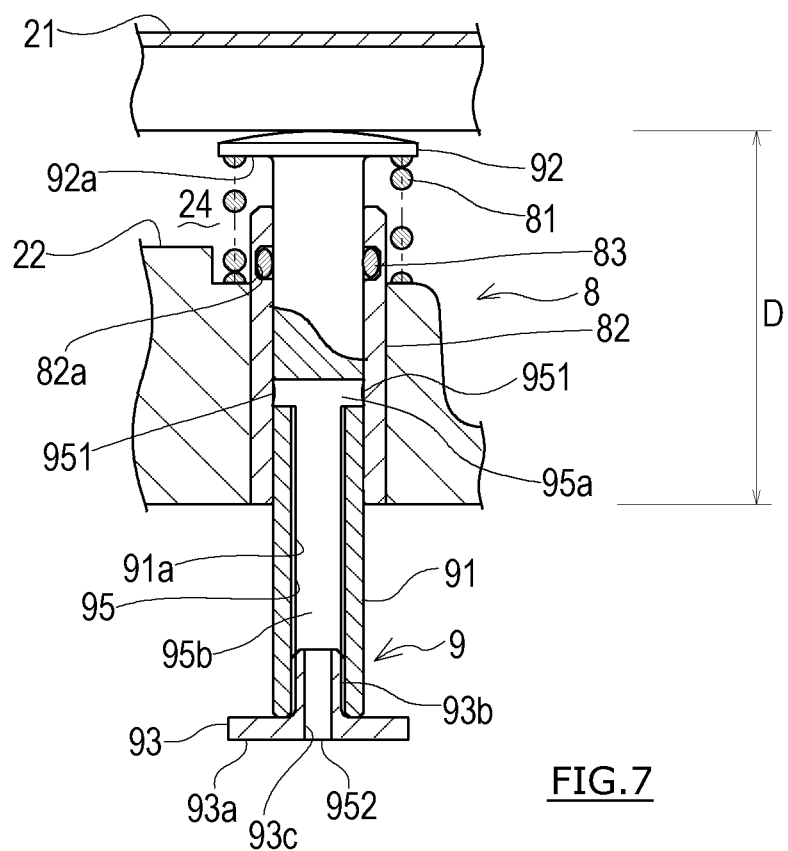
FIG. 7 is an enlarged view showing the height stopper mechanism according to the second embodiment.

Next, the second embodiment will be explained. FIG. 5 is a cross-sectional view showing the air spring according to the second embodiment when the height of the air spring falls within the spring height allowable range. FIG. 6 is a cross-sectional view showing the air spring according to the second embodiment when the height of the air spring exceeds the upper limit of the spring height allowable range. FIG. 7 is an enlarged view showing the height stopper mechanism according to the second embodiment. As shown in FIGS. 5 and 7, the railcar according to the second embodiment of the present invention is the same in configuration as the railcar according to the first embodiment except for the configuration of the height stopper mechanism 8 provided at the air spring 3. Therefore, only the height stopper mechanism 8 will be explained in detail. The same reference signs are used for the same or similar components as in the first embodiment, and explanations thereof are omitted.

The height stopper mechanism 8 according to the present embodiment is constituted by: the exhaust passage forming body 9 at which the exhaust passage 95 is formed, the inside of the air chamber 24 of the air spring 3 and the outside of the air chamber 24 (i.e., the atmosphere) being connected to each other through the exhaust passage 95; the tubular body 82 supporting the exhaust passage forming body 9; and the spring 81 configured to bias the exhaust passage forming body 9.

The tubular body 82 is provided at a position of the peripheral portion of the lower surface plate 22 of the air spring 3, the position not overlapping the elastic supporting body 25 in the upward/downward direction. The tubular body 82 penetrates the lower surface plate 22 in the upward/downward direction. The upper end of the tubular body 82 is open to the inside of the air chamber 24, and the lower end of the tubular body 82 is open to the atmosphere. The sealing member holding portion 82a that is an annular groove is formed on the inner peripheral surface of the tubular body 82.

The exhaust passage forming body 9 is constituted by: the columnar main member 91 extending in the upward/downward direction; the base end member 92 provided at the upper end of the main member 91; and the tip end member 93 provided at the lower end of the main member 91. The exhaust passage forming body 9 penetrates the lower surface plate 22 of the air spring 3 in the upward/downward direction. The tubular body 82 is externally fitted to the main member 91 so as to be slidable in the upward/downward direction. A gap between the inner peripheral surface of the tubular body 82 and the outer peripheral surface of the exhaust passage forming body 9 is sealed by the sealing member 83 such as an O-ring provided at the sealing member holding portion 82a of the tubular body 82. The sealing member 83 seals the inner peripheral surface of the tubular body 82 and the outer peripheral surface of the exhaust passage forming body 9. Thus, the space of the air chamber 24 and the space of the atmosphere are isolated from each other.

The base end member 92 has a disc shape larger in diameter than the main member 91. The lower surface of the base end member 92 is joined to an upper surface of the main member 91. The upper surface of the base end member 92 is formed in a smooth spherical shape and contacts the upper surface plate 21 of the air spring 3. The lower surface of the base end member 92 may be subjected to a surface treatment such that friction between the lower surface of the base end member 92 and the upper surface plate 21 is reduced.

A portion of the lower surface of the base end member 92 serves as the spring seat 92a, the portion being located at an outer periphery side of the main member 91. The spring 81 is provided between the spring seat 92a and the lower surface plate 22. The spring 81 is in a compressed state when the spring height of the air spring 3 falls within the spring height allowable range. The spring 81 has a free length when the height of the air spring 3 is equal to or more than the upper limit of the spring height allowable range. The exhaust passage forming body 9 is biased by the spring 81 such that the upper surface of the base end member 92 contacts the upper surface plate 21.

The tip end member 93 integrally includes the head portion 93a and the screw portion 93b. The head portion 93a is formed in a disc shape having a diameter larger than the outer diameter of the main member 91 and the inner diameter of the tubular body 82. The screw portion 93b is formed so as to project from the upper surface of the head portion 93a. The external screw is cut on the outer periphery of the screw portion 93b. The screw hole 91a having a diameter corresponding to the diameter of the screw portion 93b of the tip end member 93 is formed on the lower end surface of the main member 91. The tip end member 93 and the main member 91 are coupled to each other in such a manner that the screw portion 93b of the tip end member 93 is screwed into the screw hole 91a of the main member 91.

The head portion 93a of the tip end member 93 projects downward from the lower surface plate 22 of the air spring 3 and forms the tip end of the exhaust passage forming body 9. The head portion 93a of the tip end member 93 can contact the lower surface of the lower surface plate 22 and serves as a stopper for preventing the exhaust passage forming body 9 from falling off from the tubular body 82.

The exhaust passage 95 formed at the exhaust passage forming body 9 is formed in a T shape by the first passage 95a and the second passage 95b. The first passage 95a penetrates the exhaust passage forming body 9 in the radial direction of the exhaust passage forming body 9. The second passage 95b extends in the axial direction of the exhaust passage forming body 9. One end of the first passage 95a is open on the peripheral surface of the main member 91 of the exhaust passage forming body 9 to form the exhaust passage inlet 951. The other end of the first passage 95a is open at the screw hole 91a formed at the main member 91. The second passage 95b is formed by cooperation of the screw hole 91a formed at the main member 91 and the hole 93c penetrating the tip end member 93 in the upward/downward direction. A lower end of the second passage 95b is open on a lower surface of the tip end member 93, that is, a lower end surface of the exhaust passage forming body 9 to form the exhaust passage outlet 952.

A position of the exhaust passage inlet 951 in the exhaust passage forming body 9 is determined such that: when the clearance D between the upper surface plate 21 and the lower surface plate 22 in the upward/downward direction (hereinafter simply referred to as the "clearance D") falls within the predetermined allowable range, the exhaust passage inlet 951 is open to the outside of the air chamber 24 (i.e., to the atmosphere); and when the clearance D exceeds the upper limit of the predetermined allowable range, the exhaust passage inlet 951 is open to the inside of the air chamber 24. In the present embodiment, the allowable range of the clearance D is determined based on the spring height allowable range of the air spring 3. Thus, the spring height allowable range and the allowable range of the clearance D correspond to each other. As shown in FIG. 5, in the present embodiment, a distance between the lower surface of the upper surface plate 21 and the lower surface of the lower surface plate 22 in the upward/downward direction is defined as the clearance D. However, the clearance D can be set suitably.

In the exhaust passage forming body 9 according to the present embodiment, the position of the exhaust passage inlet 951 is determined such that: when the clearance D falls within the allowable range, the exhaust passage inlet 951 is located lower than the sealing member holding portion 82a of the tubular body 82; and when the clearance D exceeds the upper limit of the allowable range, the exhaust passage inlet 951 is located higher than the sealing member holding portion 82a of the tubular body 82.

Next, operations of the height stopper mechanism 8 will be explained. The base end member 92 of the exhaust passage forming body 9 is kept in contact with the upper surface plate 21 by biasing of the spring 81. Therefore, when the clearance D changes in accordance with the change in the height of the air spring 3, the tubular body 82 fixed to the lower surface plate 22 slides on the peripheral surface of the exhaust passage forming body 9 in the upward/downward direction. As shown in FIG. 5, when the clearance D falls within the allowable range, the exhaust passage inlet 951 of the exhaust passage forming body 9 is located outside the air chamber 23. To be specific, the exhaust passage inlet 951 of the exhaust passage forming body 9 is located lower than the sealing member holding portion 82a of the tubular body 82. When the exhaust passage inlet 951 is located outside the air chamber 23, the exhaust passage 95 and the air chamber 24 are not connected to each other, so that the air in the air chamber 24 is not discharged through the exhaust passage 95.

As shown in FIG. 6, when the air spring 3 becomes the excessive air supply state, and the clearance D exceeds the upper limit of the allowable range, the exhaust passage inlet 951 of the exhaust passage forming body 9 is located inside the air chamber 24. To be specific, the exhaust passage inlet 951 of the exhaust passage forming body 9 is located higher than the sealing member holding portion 82a of the tubular body 82. When the exhaust passage inlet 951 is located inside the air chamber 24, the exhaust passage 95 and the air chamber 24 are in connection with each other, so that the air in the air chamber 24 is discharged to the outside through the exhaust passage 95. When the clearance D returns to the allowable range by the discharge of the excessive air from the air chamber 24 to the outside as above, the exhaust passage inlet 951 is again located outside the air chamber 24, so that the exhaust passage 95 and the air spring 3 are not in connection with each other.

The foregoing has explained preferred embodiments (the first and second embodiments) of the present invention, but the above configuration can be modified as below.

For example, in the first and second embodiments, the height stopper mechanism 8 includes one unit constituted by the exhaust passage forming body 9, the tubular body 82, and the spring 81. However, the height stopper mechanism 8 may include a plurality of units each constituted by the exhaust passage forming body 9, the tubular body 82, and the spring 81.

Further, for example, in the first and second embodiments, the railcar includes the automatic level controlling valve 6 for the purpose of: reducing the inclination of the carbody in a curved line section; and maintaining the height of the carbody constant regardless of the change in the load by increase or decrease of passengers and the like. However, the railcar not including the automatic level controlling valve 6 can include the height stopper mechanism 8.

Further, for example, in the first and second embodiments, the bogie 1 is a bolsterless bogie. However, the bogie 1 may include a bogie including a bolster. In this case, the air spring is provided between the carbody and the bolster.

REFERENCE SIGNS LIST 1 bogie
2 carbody
3 air spring
11 bogie frame
12 underframe
21 upper surface plate
22 lower surface plate
23 elastic film
24 air chamber
25 elastic supporting body (elastic supporting member)
9 exhaust passage forming body (exhaust passage forming member)
91 main member
92 base end member
93 tip end member
95 exhaust passage
951 exhaust passage inlet
952 exhaust passage outlet
81 spring (biasing member)
82 tubular body (tubular member)
83 sealing member

The invention claimed is:

1. An air spring comprising:
an upper surface plate;
a lower surface plate opposing the upper surface plate;
an elastic film airtightly coupling a peripheral portion of the upper surface plate and a peripheral portion of the lower surface plate to each other to form an air chamber inside the air spring;
an elastic supporting member connected to the lower surface plate; and
an exhaust passage forming member, an exhaust passage being formed at the exhaust passage forming member and including an exhaust passage inlet and an exhaust passage outlet,
the exhaust passage inlet being open to an outside of the air chamber when a clearance between the upper surface plate and the lower surface plate in an upward/downward direction falls within a predetermined allowable range and being open to an inside of the air chamber when the clearance exceeds the predetermined allowable range,
the exhaust passage outlet being open to an atmosphere,
the exhaust passage forming member is provided through the upper surface plate or the lower surface plate so as to be relatively displaceable from a position where the exhaust passage inlet opens to the outside of the air chamber to a position where the exhaust passage inlet opens to the inside of the air chamber.

2. The air spring according to claim 1, wherein the exhaust passage forming member has a columnar shape including a peripheral surface and an end surface, the exhaust passage inlet being provided at the peripheral surface, the exhaust passage outlet being provided at the end surface.

3. The air spring according to claim 2, further comprising a tubular member including an inner end portion opening to an inside of the air chamber and an outer end portion opening to an outside of the air chamber, the tubular member being externally fitted to the exhaust passage forming member, the tubular member being configured to slide in the upward/downward direction on the peripheral surface of the exhaust passage forming member in accordance with a change in the clearance.

4. The air spring according to claim 3, further comprising a sealing member configured to seal a gap between the tubular member and the exhaust passage forming member, wherein
the inside of the air chamber and the outside of the air chamber are isolated from each other by the sealing member.

5. The air spring according to claim 1, wherein the exhaust passage forming member includes: a tip end portion projecting upward from the upper surface plate; and a base end portion contacting the lower surface plate in the air chamber, and the exhaust passage forming member is provided at the upper surface plate and penetrates the upper surface plate in the upward/downward direction.

6. The air spring according to claim 5, wherein the base end portion of the exhaust passage forming member has a spherical shape, the base end portion contacting the lower surface plate.

7. The air spring according to claim 5, further comprising a biasing member configured to bias the exhaust passage forming member toward the lower surface plate such that the base end portion of the exhaust passage forming member contacts the lower surface plate.

8. The air spring according to claim 1, wherein the exhaust passage forming member includes: a tip end portion projecting downward from the lower surface plate; and a base end portion contacting the upper surface plate in the air chamber, and the exhaust passage forming member is provided at the lower surface plate and penetrates the lower surface plate in the upward/downward direction.

9. The air spring according to claim 8, wherein the base end portion of the exhaust passage forming member has a spherical shape, the base end portion contacting the upper surface plate.

10. The air spring according to claim 8, further comprising a biasing member configured to bias the exhaust passage forming member toward the upper surface plate such that the base end portion of the exhaust passage forming member contacts the upper surface plate.

11. A railcar comprising:
a carbody including an underframe;
a bogie including a bogie frame; and
the air spring according to claim 1, the air spring being provided between the bogie frame and the underframe.

* * * * *